United States Patent
Kamio

(10) Patent No.: US 10,615,724 B2
(45) Date of Patent: Apr. 7, 2020

(54) SHIFT RANGE CONTROL APPARATUS

(71) Applicant: DENSO CORPORATION, Kariya, Aichi-pref. (JP)

(72) Inventor: Shigeru Kamio, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/096,054

(22) PCT Filed: Mar. 6, 2017

(86) PCT No.: PCT/JP2017/008699
§ 371 (c)(1),
(2) Date: Oct. 24, 2018

(87) PCT Pub. No.: WO2017/187789
PCT Pub. Date: Nov. 2, 2017

(65) Prior Publication Data
US 2019/0131897 A1 May 2, 2019

(30) Foreign Application Priority Data

Apr. 26, 2016 (JP) ................. 2016-087741

(51) Int. Cl.
| H02P 23/12 | (2006.01) |
| H02P 6/15 | (2016.01) |
| F16H 61/28 | (2006.01) |
| F16H 59/04 | (2006.01) |
| H02P 6/28 | (2016.01) |
| F16H 61/32 | (2006.01) |
| F16H 61/02 | (2006.01) |

(52) U.S. Cl.
CPC ............. *H02P 6/153* (2016.02); *F16H 59/04* (2013.01); *F16H 61/28* (2013.01); *F16H 61/32* (2013.01); *H02P 6/28* (2016.02); *F16H 61/02* (2013.01); *F16H 2061/326* (2013.01)

(58) Field of Classification Search
CPC . H02P 6/153; H02P 6/28; F16H 61/32; F16H 2061/326
USPC ................................................... 318/400.14
See application file for complete search history.

(56) References Cited

U.S. PATENT DOCUMENTS

| 6,719,076 B1* | 4/2004 | Tabata ................... B60K 31/00 180/65.7 |
| 2004/0066166 A1 | 4/2004 | Nakai et al. |
| 2005/0174084 A1 | 8/2005 | Nakai et al. |
| 2006/0006827 A1 | 1/2006 | Nakai et al. |

(Continued)

FOREIGN PATENT DOCUMENTS

| WO | 2017/179336 | 10/2017 |
| WO | 2017/179337 | 10/2017 |

*Primary Examiner* — Eduardo Colon Santana
*Assistant Examiner* — Gabriel Agared
(74) *Attorney, Agent, or Firm* — Nixon & Vanderhye PC

(57) ABSTRACT

A shift range control apparatus switching a shift range by controlling a drive of a motor, the shift range control apparatus includes: an idle running determiner that is configured to determine whether a rotation state of the motor is an idle running state in which the motor rotates within a range of play existing between a motor shaft being a rotation shaft of the motor and an output shaft to which a rotation of the motor is transmitted; and a current limiter that is configured to limit a current of the motor when it is determined that the rotation state of the motor is the idle running state.

5 Claims, 8 Drawing Sheets

(56) References Cited

U.S. PATENT DOCUMENTS

| | | | |
|---|---|---|---|
| 2009/0319109 A1* | 12/2009 | Ando | B60K 1/02 701/22 |
| 2015/0222211 A1 | 8/2015 | Maruo et al. | |
| 2015/0336606 A1* | 11/2015 | Shibuya | B60W 10/02 180/444 |
| 2015/0353128 A1* | 12/2015 | Shibuya | B60W 10/02 701/41 |

* cited by examiner

SHIFT RANGE CONTROL APPARATUS

CROSS-REFERENCE TO RELATED APPLICATION

This application is the U.S. national phase of International Application No. PCT/JP2017/008699 filed Mar. 6, 2017, which designated the U.S. and claims priority to Japanese Patent Application No. 2016-87741 filed on Apr. 26, 2016, the entire contents of each of which are incorporated herein by reference.

TECHNICAL FIELD

The present disclosure relates to a shift range control apparatus.

BACKGROUND ART

A shift range switching apparatus that switches a shift range by controlling a motor in accordance with a shift range switching request from a driver has been known. Patent Literature 1 employs a switched reluctance motor as a driving source of the shift range switching mechanism, and rotates a detent lever integrated with the output shaft through a reducer, for example.

The inventor of the present disclosure finds out the following. A play such as gear backlash exists between a motor shaft and an output shaft. Therefore, the motor shaft quickly rotates in a zone of the play, and a collision sound may happen when a zone of the play ends.

PRIOR ART LITERATURE

Patent Literature

Patent Literature 1: JP 4385768 B2

SUMMARY OF INVENTION

It is an object of the present disclosure to provide a shift range control apparatus enabling to suppress occurrence of a collision sound at the time of switching a shift range.

A shift range control apparatus according to one aspect of the present disclosure switches a shift range by controlling drive of a motor and includes an idle running determiner and a current limiter.

The idle running determiner determines whether a rotation state is an idle running state that the motor rotates within a range of play existing between a motor shaft that is a rotation shaft of the motor and an output shaft to which a rotation of the motor is transmitted.

When it is determined as the idle running state, the current limiter limits a current of the motor.

It may be possible to suppress occurrence of the collision sound at the time of shift range switching.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

The shift range control apparatus according to the present disclosure will be explained with reference to the drawings. Hereinafter, in multiple embodiments, an explanation will be omitted by applying an identical reference to actually similar configuration.

First Embodiment

FIGS. 1 to 7 show the shift range control apparatus according to a first embodiment of the present disclosure.

Figure 1:
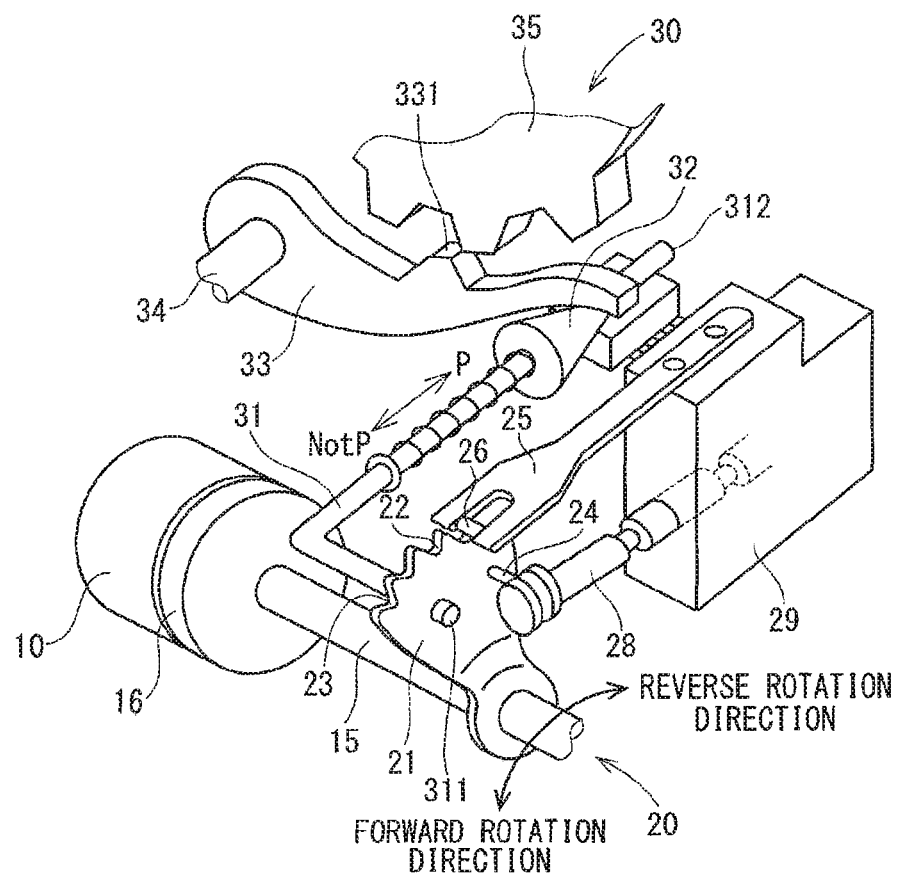
FIG. 1 is a perspective view showing a shift-by-wire system according to a first embodiment of the present disclosure.
Figure 2:
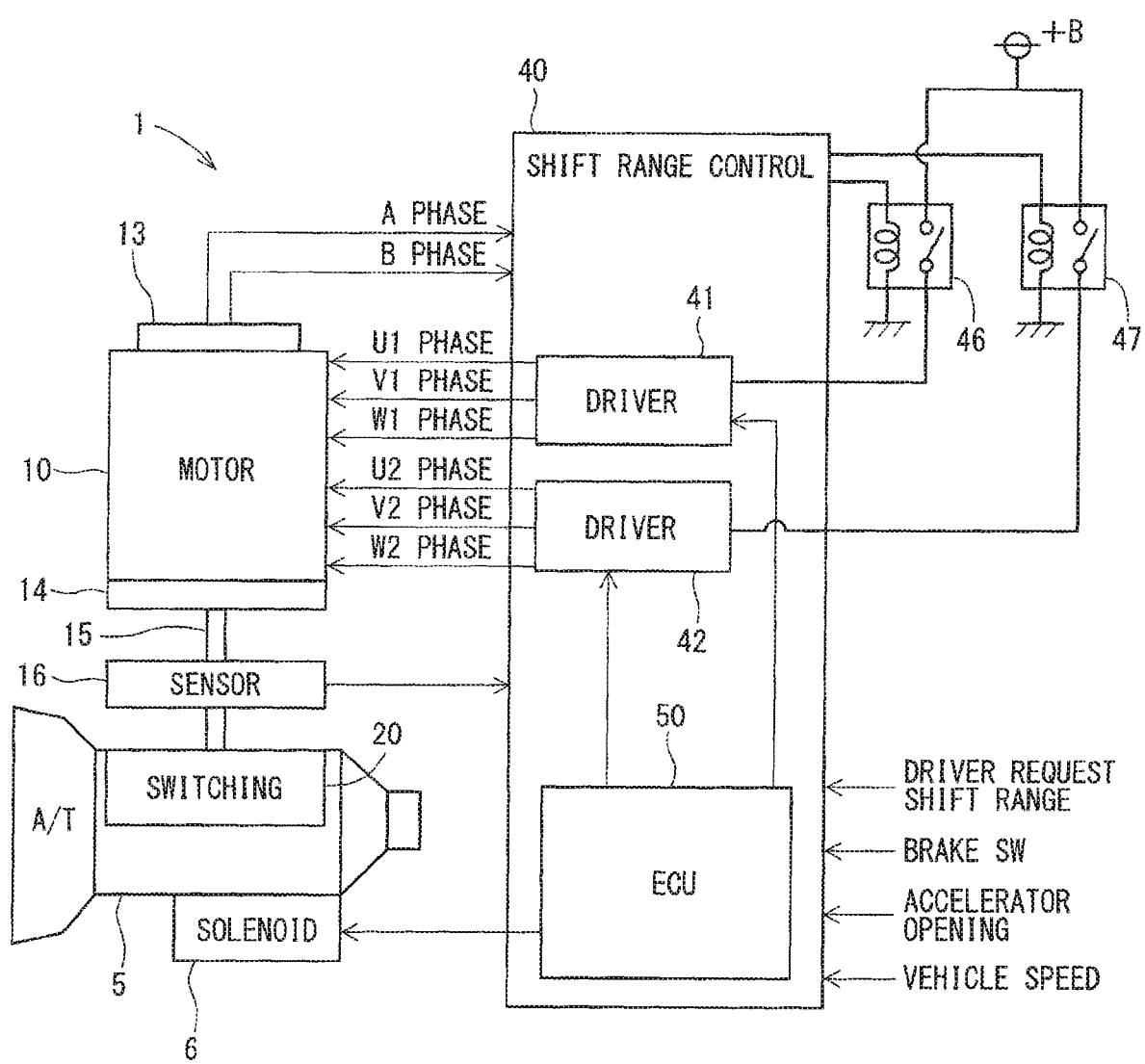
FIG. 2 is a diagram showing a schematic configuration of a shift-by-wire system according to the first embodiment.

As shown in FIG. 1 and FIG. 2, a shift-by-wire system 1 includes a motor 10, a shift range switching mechanism 20, a parking lock mechanism 30, a shift range control apparatus 40, or the like.

Figure 3:
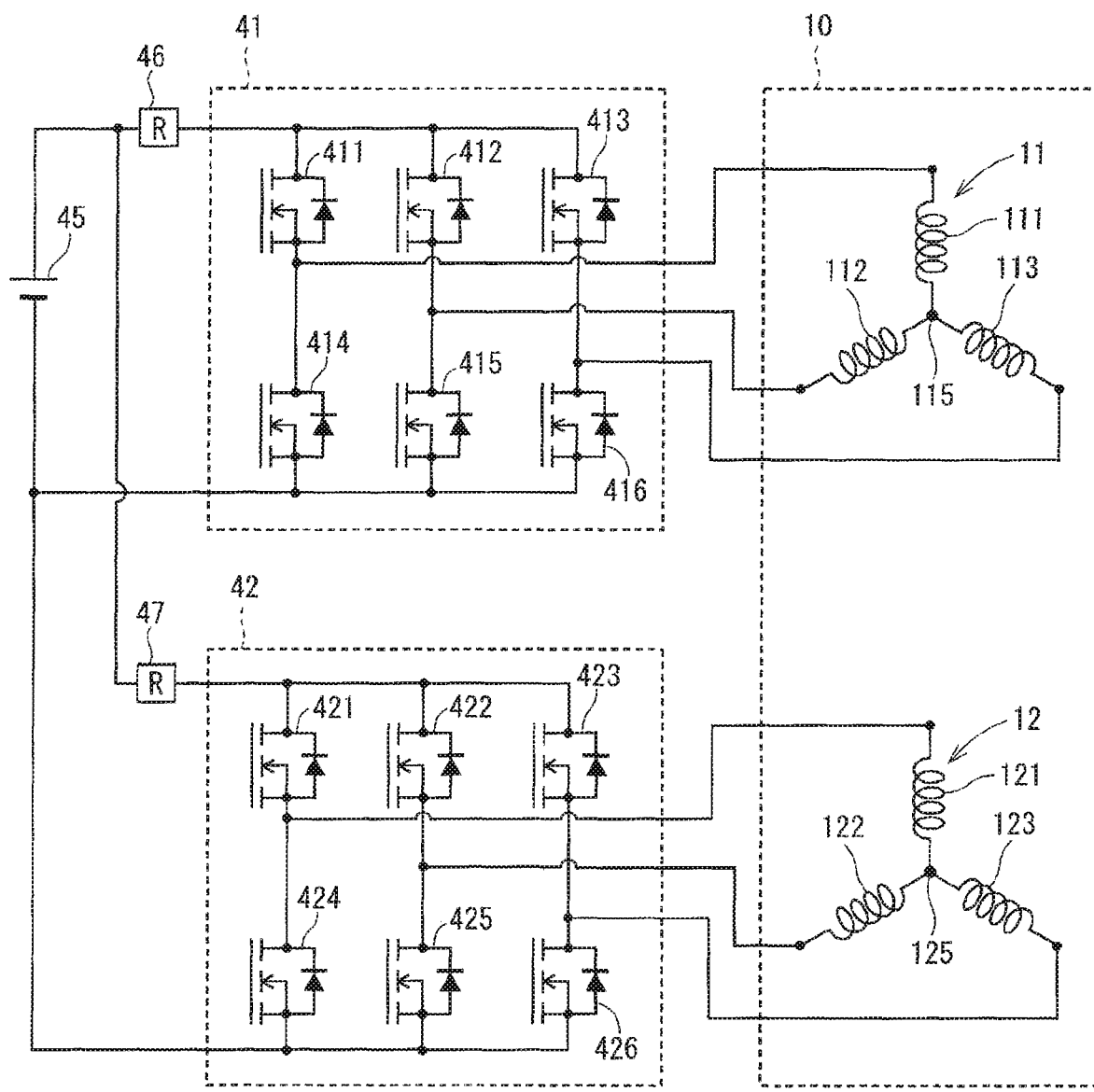
FIG. 3 is a circuit diagram showing a motor and a motor driver according to the first embodiment.

The motor 10 is rotated by power supplied from a battery 45 (as described in FIG. 3) installed in a vehicle (not shown) and functions as a drive source of the shift range switching mechanism 20. The motor 10 is employed, the motor being capable of changing the amount of a current by feedback control and varying the command for each phase. The motor 10 according to the embodiment is a permanent magnet DC brushless motor. As shown in FIG. 3, the motor 10 includes two winding groups 11 and 12. The first winding group 11 includes a U1 coil 111, a V1 coil 112, and a W1 coil 113. The second winding group 12 includes a U2 coil 121, a V2 coil 122, and a W2 coil 123.

As shown in FIG. 2, an encoder 13 detects a rotation position of a rotor (not shown) of the motor 10. The encoder 13 is configured from a magnet rotating with the rotor, a hall IC detecting magnetic field, or the like. The encoder 13 synchronizes with the rotation of the rotor, and outputs A-phase and B-phase pulse signals for each predetermined angle.

A reducer 14 is placed between an output shaft 15 and the motor shaft of the motor 10. The reducer 14 reduces the rotation of the motor 10, and outputs the rotation of the motor to the output shaft 15. Thereby, the rotation of the motor 10 is transmitted to the shift range switching mechanism 20. An output shaft sensor 16 detects an output shaft angle θs being an angle of the output shaft. The output shaft sensor 16 is placed in the output shaft 15 for detecting the angle of the output shaft 15. The output shaft sensor 16 is a potentiometer, for example.

As shown in FIG. 1, the shift range switching mechanism 20 includes a detent plate 21, a detent spring 25, or the like. The shift range switching mechanism 20 transmits to a manual valve 28 and the parking lock mechanism 30, a rotation drive force output from the reducer 14.

The detent plate 21 is fixed to the output shaft 15 and driven by the motor 10. According to the embodiment, a direction in which the detent plate 21 moves away from a proximal end of the detent spring 25 is referred to as a forward rotation direction, and the direction in which the detent plate approaches the proximal end is referred to as a reverse rotation direction.

The detent plate 21 has a pin 24 protruding parallel with the output shaft 15. The pin 24 is connected to the manual valve 28. As the detent plate 21 is driven by the motor 10, the manual valve 28 reciprocates along an axial direction. That is, the shift range switching mechanism 20 converts the rotation motion of the motor 10 to linear movement and transmits it to the manual valve 28. The manual valve 28 is placed at a valve body 29. The manual valve 28 reciprocates along the axial direction, and thereby a hydraulic pressure supply path to a hydraulic clutch (not shown) is switched. An engaged state of the hydraulic clutch is switched, so that the shift range is switched.

Four recesses 22 are placed on the side closer to the detent spring 25 of the detent plate 21, the four recesses retaining the manual valve 28 at positions corresponding to each shift range. The recesses 22 each correspond to each of the shift ranges of D (drive), N (neutral), R (reverse), and P (park) ranges from the proximal end of the detent spring 25.

The detent spring 25 is a resiliently deformable plate-shaped member and a detent roller 26 is placed at a tip of the detent spring 25. The detent roller 26 fits into one of the recesses 22.

The detent spring 25 presses the detent roller 26 toward the rotation center of the detent plate 21. When a rotation force equal to or more than a predetermined level is applied to the detent plate 21, the detent spring 25 is deformed resiliently and the detent roller 26 moves to the recess 22. The detent roller 26 moves from one recess 22 to another recess 22. With the detent roller 26 fitted in one of the recesses 22, the pivoting motion of the detent plate 21 is restricted, an axial direction position of the manual valve 28 and the state of the parking lock mechanism 30 are determined. The shift range of an automatic transmission 5 is fixed.

The parking lock mechanism 30 includes a parking rod 31, a conical member 32, a parking lock pawl 33, a shaft part 34, and a parking gear 35.

The parking rod 31 is provided as a substantially L-shape, and a side of one end 311 is fixed to the detent plate 21. The conical member 32 is provided to the other end 312 of the parking rod 31. The conical member 32 is formed so as to contract toward the other end 312. When the detent plate 21 pivots in the reverse rotation direction, the conical member 32 moves toward the direction of arrow P.

The parking lock pawl 33 abuts on a conical surface of the conical member 32 and can pivot around the shaft part 34. On the side of the parking gear 35 in the parking lock pawl 33, the parking lock pawl 33 has a protrusion 331 that can mesh with the parking gear 35. When the detent plate 21 rotates in the reverse rotation direction, the conical member 32 moves in the direction of arrow P, and the parking lock pawl 33 is pushed up so that the protrusion 331 meshes with the parking gear 35. By contrast, when the detent plate 21 rotates in the forward rotation direction and the conical member 32 moves in the direction of arrow Not P, the protrusion 331 is dissolved to mesh with the parking gear 35.

The parking gear 35 is placed at an axle (not shown) so as to be capable of meshing with the protrusion 331 on the parking lock pawl 33. The parking gear 35 meshing with the protrusion 331 restricts the rotation of the axle. When the shift range is one of the ranges other than P (Not P range), the parking gear 35 is not locked by the parking lock pawl 33, so that the rotation of the axle is not stopped by the parking lock mechanism 30. When the shift range is the P range, the parking gear 35 is locked by the parking lock pawl 33, and the rotation of the axle is restricted.

As shown in FIG. 2 and FIG. 3, the shift range control apparatus 40 includes motor drivers 41 and 42, an ECU 50, or the like.

The motor driver 41 is a three-phase inverter switching the energization of first winding group 11. Switching elements 411 to 416 are bridge-connected. One end of the U1 coil 111 is connected to a connection point between the pair of U-phase switching elements 411 and 414. One end of the V1 coil 112 is connected to a connection point between the pair of V-phase switching elements 412 and 415. One end of the W1 coil 113 is connected to a connection point between the pair of W-phase switching elements 413 and 416. The other ends of the coils 111 to 113 are connected at a connection portion 115.

The motor driver 42 is a three-phase inverter switching the energization of second winding group 12. Switching elements 421 to 426 are bridge-connected. One end of the U2 coil 121 is connected to a connection point between the pair of U-phase switching elements 421 and 424. One end of the V2 coil 122 is connected to a connection point between the pair of V-phase switching elements 422 and 425. One end of the W2 coil 123 is connected to a connection point between the pair of W-phase switching elements 423 and 426. The other ends of the coils 121 to 123 are connected at a connection portion 125.

The switching elements 411 to 416 and 421 to 426 according to the embodiment are MOSFETs. Other devices such as IGBTs may also be employed.

A motor relay 46 is placed between the motor driver 41 and the battery 45. A motor relay 47 is placed between the motor driver 42 and the battery 45. The motor relays 46 and 47 turn on when a starter switch, such as an ignition switch or the like, turns on, so that power is supplied to the motor 10. The motor relays 46 and 47 turn off while the starter switch turns off, so that power supply to the motor 10 is shut off.

The ECU 50 controls the drive of the motor 10 by controlling on-off actuation of the switching elements 411 to 416, 421 to 426. The ECU 50 controls the drive of a transmission hydraulic control solenoid 6 based on vehicle speed, accelerator opening degree, and driver request shift range or the like. The transmission hydraulic control solenoid 6 is controlled and thereby shift stage is controlled. The transmission hydraulic control solenoid 6 is controlled and thereby shift stage is controlled. According to the embodiment, though one ECU 50 controls the drive of the motor 10 and the solenoid 6, a motor ECU for motor control controlling the motor 10 and an AT-ECU may be separately provided. A drive control of the motor 10 will be mainly explained.

Figure 4:
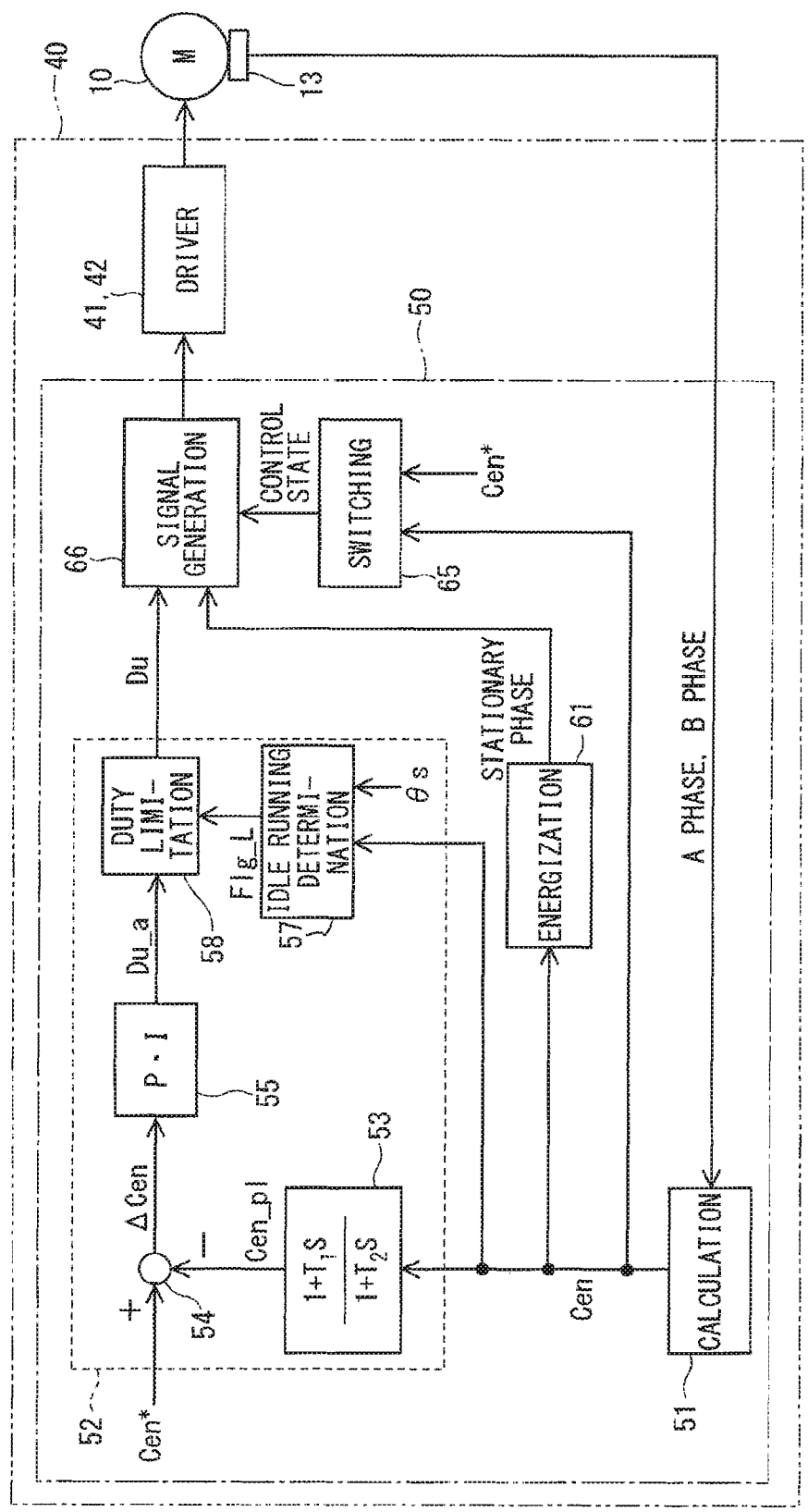
FIG. 4 is a block diagram showing the shift range control apparatus according to the first embodiment.

As shown in FIG. 4, the ECU 50 includes an angle calculator 51, a feedback controller 52, a stationary phase energization controller 61, a switching controller 65 and a signal generator 66 or the like. The ECU 50 is mainly configured from a microcomputer or the like. Various processes in the ECU 50 may be software processes of a program already stored in a tangible memory device such as a ROM and executed by a CPU, or may be hardware processes executed by special electronic circuits.

The angle calculator 51 calculates an actual count value Cen that is the count value of the encoder 13, based on the A-phase and B-phase pulses output from the encoder 13. The actual count value Cen is a value corresponding to an actual mechanical angle and an actual electrical angle of the motor 10. According to the embodiment, the actual count value Cen is referred to as "an actual angle".

As described above, the reducer 14 is placed between the motor shaft of the motor 10 and the output shaft 15. When the motor shaft rotates within the range of play in gear teeth of the reducer 14 in a case where the starter switch turns off, the relative position between the motor shaft and the output shaft 15 at when the starter switch turns off may be different from the relative position between the motor shaft and the output shaft 15 at when the starter switch turns on. Therefore, the angle calculator 51 performs initial learning and calculates a correction value when the starter switch turns on. The initial learning adjusts the count value of the encoder 13 to the position of the output shaft 15 by a wall abutment control rotating the motor 10 in both directions and abutting to the wall in the both sides of the gear meshing with the motor shaft. The actual count value Cen may be a value after correction with the correction value.

The feedback controller 52 includes a phase advance filter 53, a subtractor 54, and a controller 55, an idle running determiner 57 and a duty limiter 58 as a current limiter. The feedback controller 52 performs the position feedback control.

The phase advance filter 53 performs a phase advance compensation in which a phase of the actual count value Cen is advanced, and calculates a phase advance value Cen_pl. "The actual angle" may include the phase advance value Cen_pl executing the phase advance filter process.

The subtractor 54 calculates a deviation ΔCen between the phase advance value Cen_pl and the target count value Cen* corresponding to the driver request shift range inputted by operation of a shift lever (not shown) in the drawings or the like.

The controller 55 calculates a duty Du_a before limitation by PI control or the like so that the deviation ΔCen becomes 0 in order to match the target count value Cen* with the actual count value phase advance value Cen_pl. The position feedback control may be possible to vary magnitude of current flowing in the coils 111 to 113, 121 to 123 and torque by changing the duty with PWM control or the like.

According to the embodiment, rectangular wave control by energization of 120° controls the drive of the motor 10. In the rectangular wave control by the energization of 120°, the switching element in a side of high voltage of the first phase and a switching element in a side of low voltage of the second phase turn on. An energization phase is switched by changing combination of the first phase and the second phase every electric angle 60°. Rotation magnetic field occurs in the winding groups 11, 12 and the motor 10 rotates. According to the embodiment, a rotation direction of the motor 10 at the time of rotating the output shaft 15 in the forward rotation direction is set to a forward direction. The duty at when the motor 10 outputs positive torque is set to positive. The duty at when the motor 10 outputs negative torque is set to negative. A duty range to be acquired is set to −100[%] to 100[%]. The duty is set to positive when the motor 10 is caused to perform the forward rotation. The duty is set to negative when the motor 10 is caused to perform the reverse rotation. The rotation direction of the motor 10 is the forward rotation direction when a brake torque (that is, negative torque) occurs for stopping the motor 10 performing the forward rotation. In this case, the duty becomes negative. Similarly, the duty becomes positive when the brake torque occurs for stopping the motor 10 performing the reverse rotation.

The idle running determiner 57 determines whether a rotation state of the motor 10 is an idle running state. The idle running determiner 57 turns on a current limitation flag Flg_L and outputs to the duty limiter 58 when the rotation state of the motor 10 is the idle running state.

Details of the idle running determination are described later.

The duty limiter 58 limits a duty to limit a maximum value of the motor current when the rotation state of the motor 10 is the idle running state.

The duty limiter 58 limits the maximum value of the duty to a maximum duty DH when the current limitation flag Flg_L turns on. In detail, the duty limiter 58 limits the duty Du after the limitation to the maximum duty DH, in a case where an absolute value of the duty Du_a before the limitation exceeds the maximum duty DH. The duty limiter 58 sets the duty Du_a to the duty Du after the limitation, in a case where the absolute value of the duty Du_a before the limitation is equal to or less than the maximum duty DH. The positive or negative of the duty after the limitation conforms to the duty before the limitation. The duty Du_a before the limitation keeps to be set as the duty Du after the limitation, in a case where the current limitation flag Flg_L turns off.

The duty Du after the limitation is output to the signal generator 66.

The stationary phase energization controller 61 performs a stationary phase energization control. The stationary phase control energization control is a control for stopping the rotation for the motor 10. The stationary phase control energization control selects the stationary phase corresponding to the electric angle and controls the switching elements 411 to 416, 421 to 426, so that the current flows in a predetermined direction of the selected stationary phase. An excitation phase is fixed. When the excitation phase is fixed, the motor 10 stops at a predetermined electric angle corresponding to the excitation phase. The stationary phase energization controller 61 selects the stationary phase and the energization phase based on the actual count value Cen so as to stop the motor 10 at the electric angle that is the closest from the present rotor position.

The stationary phase energization control is performed when difference between the actual count value Cen and the target count value Cen* becomes equal to or less than an angle determination threshold value ENth. It is regarded that the actual count value Cen substantially matches the target count value Cen* when the stationary phase energization control is performed. It may be possible to stop the motor 10 at a point substantially matching the target count value Cen* by stopping the electric angle that is the closest and stoppable from the present rotor position. Strictly, a gap for the motor resolution at most may occur between the electric angle corresponding to the target count value Cen* and the electric angle stopping the motor 10 in the stationary phase energization control. The gap of a stop position of the output shaft 15 is small when reduction rate of the reducer 14 is high, so that there is no difficulty.

The switching controller 65 switches a control state of the motor 10. Specifically, according to the embodiment, the switching controller 65 switches the control state to the position feedback control or the stationary phase energization control based on the target count value Cen* and the actual count value Cen.

The switching controller 65 sets the control state of the motor 10 to the position feedback control when the driver request shift range changes. The switching controller 65 switches to the stationary phase energization control when an absolute value of a difference between the target count value Cen* and the actual count value Cen is equal to or less than the angle determination threshold value ENth. The switching controller 65 continues the stationary phase energization control until the energization duration Ta elapses after the switching to the stationary phase energization control. The switching controller 65 switches to the energization off control after the energization duration Ta elapses. In the energization off control, all of the switching elements 411 to 416 and 421 to 426 turn off. According to the embodiment, the absolute value of the difference between the target count value Cen* and the actual count value Cen corresponds to "a difference value between the target angle and the actual angle".

The signal generator 66 generates the driving signal switching on/off of the switching elements 411 to 416, 421 to 426 corresponding to the control state selected by the switching controller 65. The signal generator 66 outputs to the motor drivers 41 and 42, so that the drive of the motor 10 is controlled.

Figure 5:
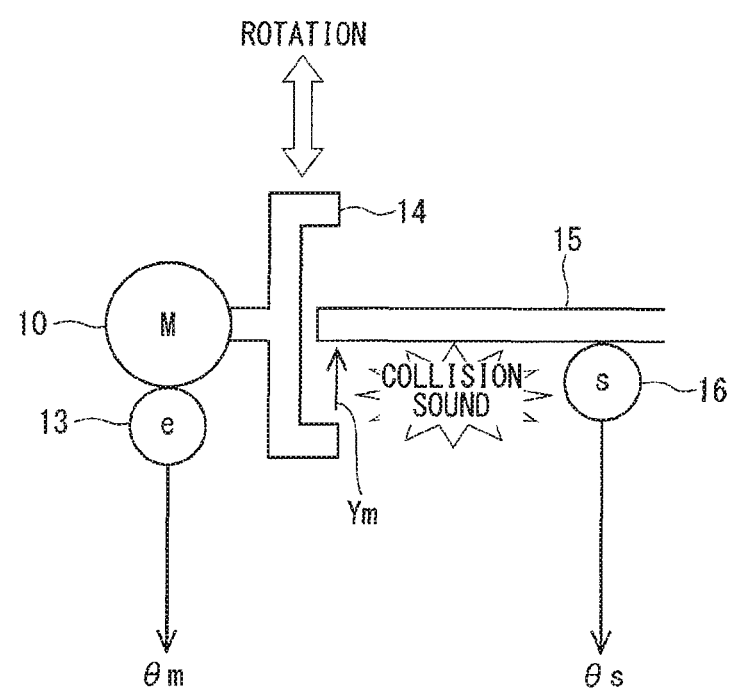
FIG. 5 is a pattern view for explaining a collision sound occurring at the time of shift range switching according to the first embodiment.

A relation between the motor shaft of the motor 10 and the output shaft 15 will be explained with reference to FIG. 5. FIG. 5 schematically shows the relation between the motor shaft and the output shaft. In FIG. 5, the rotation directions of the motor shaft and the output shaft are explained as vertical direction of the paper surface.

As shown in FIG. 5, the reducer 14 is placed between the motor shaft being a rotation shaft of the motor 10 and the output shaft 15. There is "a play" including gear backlash between the reducer 14 and the output shaft 15. According to the embodiment, the motor 10 is DC brushless motor. Therefore, the motor shaft rotates within the play and the reducer 14 and the output shaft 15 may be separated by effect such as cogging torque, when the energization to the motor 10 is stopped. The motor 10 drives after the state that the reducer 14 and the output shaft 15 are separated in a side of a rotation direction and stop. The motor shaft rotates within the play in a substantial unloaded state.

The state that the motor 10 rotates within the play existing between the motor shaft and the output shaft 15 may be set as "an idle running state". According to the embodiment, as the idle running state, a case where the motor 10 rotates in a state that the gear of the reducer 14 and the output shaft 15 are separated from each other in the side of rotation direction will be mainly explained.

A conversion value obtained by converting the rotation angle of the motor 10 corresponding to the actual count value Cen at gear ratio of the reducer 14 may be set as "a motor angle θm". As described above, the actual count value Cen is a value corrected by the initial learning. Therefore, the motor angle θm and the output shaft angle θs correspond to each other when the motor shaft and the output shaft 15 integrally rotate. Hence, a motor angle variation amount Δθm that is a variation amount of the motor angle θm and an output shaft angle variation amount Δθs that is a variation amount of the output shaft angel θs match each other when the motor shaft and the output shaft 15 integrally rotate. The variation amount Δθm and Δθs are set to be respective difference values from previous calculation values.

The idle running determiner 57 determines the rotation state of the motor 10 as the idle running state when the output shaft angle variation amount Δθs and the motor angle variation amount Δθm are different. According to the embodiment, the idle running determiner 57 determines the rotation state of the motor 10 as the idle running state when the absolute value of the difference between the output shaft angle variation amount Δθs and the motor angle variation amount Δθm exceeds an idle determination threshold value θth. The idle determination threshold value θth is set to a small value (for example, 0.1°), which may be regarded that the output shaft angle variation amount Δθs and the motor angle variation amount Δθm match.

FIG. 4 describes that the actual count value Cen is inputted to the idle running determiner 57. However, the angle calculator 51 may calculate the motor angle θm and the calculated motor angle θm may be input to the idle running determiner 57. The motor angle variation amount Δθm may be calculated as a difference value between a previous value of the motor angle θm and a present value of the motor angle θm. The motor angle variation amount Δθm may be calculated by converting the difference value between a previous value of the actual count value Cen and a present value of the actual count value Cen at the gear ratio.

As shown by an arrow sign Ym in FIG. 5, the motor 10 idles, a face inside of the reducer 14 and the output shaft 15 collide, and a collision sound occurs. Particularly, the collision sound may become big when the motor 10 idles at high speed in a case where the play is large. The face inside the reducer 14 and the output shaft 15 contact to each other, the collision sound does not occur while the motor 10 continually rotates in a similar direction, since the reducer 14 and the output shaft 15 integrally rotate.

According to the embodiment, the collision sound is suppressed by limiting the maximum value of the motor current and by suppressing the rotation speed of the motor 10 when the rotation state of the motor 10 is in the idle running state. According to the embodiment, the maximum value of the motor current is limited by limiting the duty.

The idle running determination process according to the embodiment will be explained with reference to a flowchart shown in FIG. 6. This process is executed in the ECU 50 in a predetermined period when the starter switch turns on.

In S101 at first time, the idle running determiner 57 determines whether the energization flag turns on. The energization flag turns on when the driver request shift range changes. The energization flag turns off when the stationary energization control ends. When it is determined that the energization flag turns off (S101: NO), the following process is not executed. When it is determined that the energization flag turns on (S101: YES), the process shifts to S102.

In S102, the idle running determiner 57 determines whether the output shaft angle θs varies. When it is determined that the output shaft angle θs varies (S102: YES), the process shifts to S105. When it is determined that the output shaft angle θs does not vary (S102: NO), the process shifts to S103.

In S103, the idle running determiner 57 determines whether the output shaft angle variation amount Δθs and the motor angle variation amount Δθm match. When it is determined that the output shaft angle variation amount Δθs and the motor angle variation amount Δθm match (S103: YES), the rotation state of the motor 10 is not regarded as the idle running state, and the process shifts to S105. When it is determined that the output shaft angle variation amount Δθs and the motor angle variation amount Δθm do not match (S103: NO), the rotation state of the motor 10 is regarded as the idle running state, and the process shifts to S104.

In S104, the idle running determiner 57 causes the current limitation flag Flg_L to turn on, performs output to the duty limiter 58. The duty limiter 58 limits the maximum value of the duty to the duty DH.

In S105, the current limitation flag Flg_L turns off. The duty limiter 58 does not perform the duty limitation.

Figure 7:
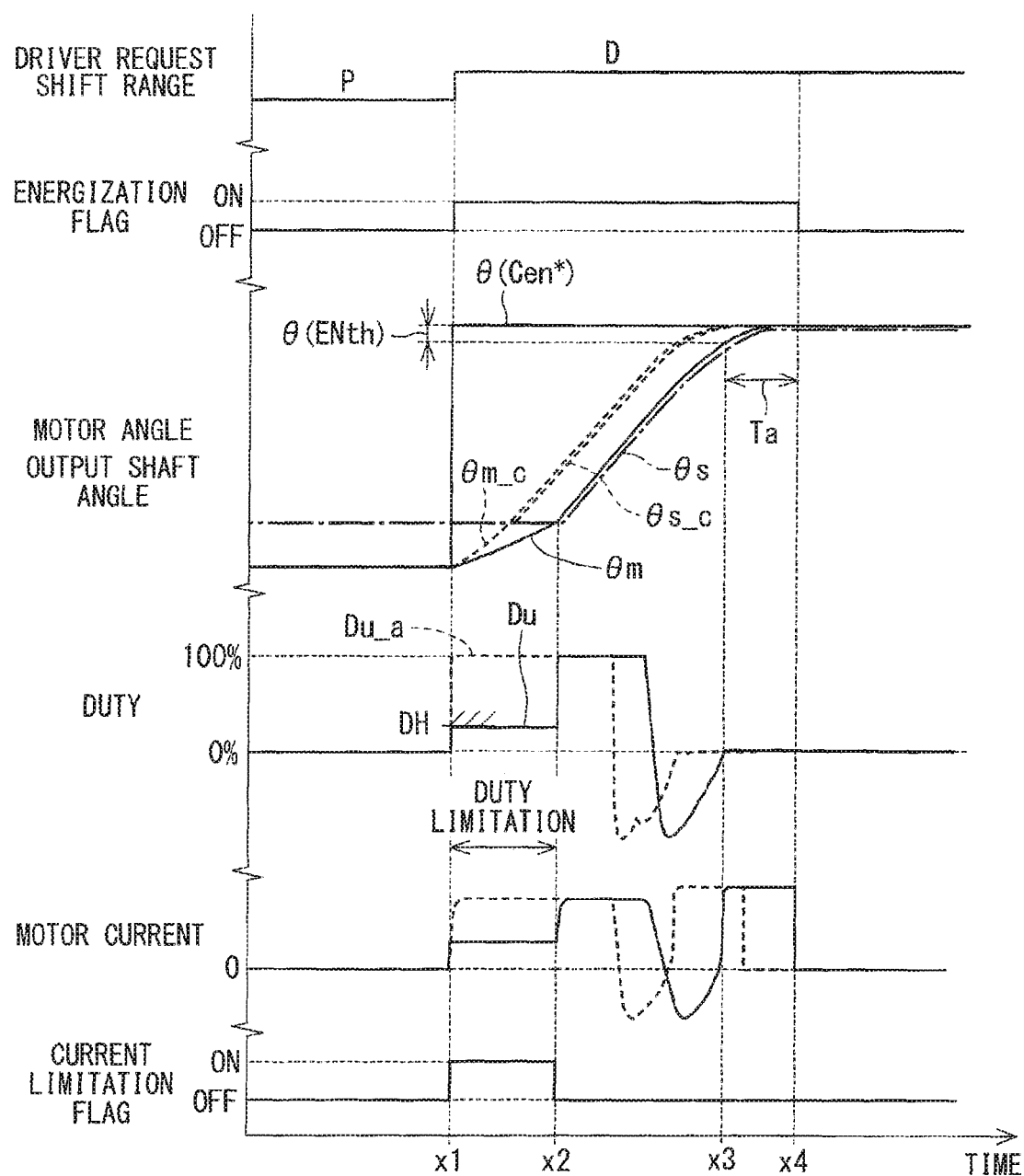
FIG. 7 is a flowchart explaining a motor control process according to the first embodiment.

The motor control process according to the embodiment will be explained with reference to a time chart of FIG. 7. In FIG. 7, common time axis is set as horizontal axis. FIG. 7 shows the driver request shift range, the energization flag, the motor angle θm, the output shaft angle θs, the duty, the motor current, and the current limitation flag Flg_L. An example that the motor 10 rotates in the forward direction to switch the shift range from the P range to the D range is explained. However, except for different points of the target count value Cen*, the direction of the motor 10, the detail of the idle running determination and the current limitation or the like at the time of switching the other range is similar to this example.

In FIG. 7, a broken arrow shows the motor current, the duty, an output shaft angle θs_c, and a motor angle θm_c when the current limitation is not performed. Regarding to the motor angle θm and the output shaft angle θs in FIG. 7, the θ(Cen*) and the θ(ENth) are values obtained by converting the target count value Cen* and the angle determination threshold value ENth at gear ratio of the reducer 14. The motor angle θm and the output shaft angle θs match when the motor shaft and the output shaft 15 integrally rotate. The motor angle θm and the output shaft angle θs are described so as to be slightly deviated from each other in the drawing, for explanation.

As shown in FIG. 7, at time x1, when the driver request shift range is changed from P range to D range, the energization flag is switched from off to on. When the driver request shift range is changed, the target count value Cen* is set corresponding to the driver request shift range. Immediate after time x1 when the driver request shift range is changed, the difference between the target count value Cen* and the actual count value Cen is larger than the angle determination threshold ENth, so that the motor 10 is controlled by the position feedback control.

According to the embodiment, a responsiveness of the motor 10 is improved by performing the position feedback control. At beginning of starting the motor 10, the difference between the target count value Cen* and the actual count value Cen is large, and the duty Du_a before the limitation becomes 100%. At the beginning of starting the motor 10, the motor 10 rotates in a state that the load is substantially 0 when the reducer 14 and the output shaft 15 are separated. Therefore, as shown by the broken line, a large collision sound may occur due to the collision of the reducer 14 with output shaft 15 when the motor 10 rotates without the limitation of the duty.

According to the embodiment, the rotation state of the motor 10 is limited from time x1 to time x2, corresponding to the idle running state. Specifically, the current limitation flag Flg_L turns on, and the maximum value of the duty is limited to the maximum duty DH. The motor current is limited. In comparison to the case where the duty is not limited, the rotation speed of the motor 10 is low, and the collision sound is suppressed. According to the embodiment, the motor current is limited until the idle running state ends.

At the time x2, when the idle running state ends and the gear of the reducer 14 abuts the output shaft 15, the collision sound does not occur since the motor shaft and the output shaft 15 integrally rotates through the reducer 14. Therefore, after the time x2, the current limitation flag Flg_L is set to turn off, the duty limitation is released, and the motor 10 is controlled by the position feedback control. The actual count value Cen approaches the target count value Cen*. It may be possible to improve the responsiveness by performing the feedback of the phase advance value Cen_pl after the phase advance filter process is executed to the phase advance value Cen_pl.

At time x3, when the difference between the target count value Cen* and the actual count value Cen becomes the angle determination threshold ENth or less, the control state of the motor 10 is switched from the position feedback control to the stationary phase energization control. The stationary phase energization enables the motor 10 to stop quickly.

While the energization duration Ta elapses until the time x4 after the time x3, the stationary phase energization control continues. Hunting or the like is suppressed, so that it may be possible to surely stop the motor 10. Therefore, it may be possible to fit the detent roller 26 to a desired recess.

At time x4 when the energization duration Ta has elapsed from the start of the stationary phase energization control, the switching controller 65 changes the control state to energization off control. The switching controller 65 turns off the energization flag. The off-state of the energization flag continues until the driver request shift range is changed again, so that the energization off control continues as the control state of the motor 10. Thereby, no power is supplied to the motor 10 except when the shift ranges are switched, so that it may be possible to reduce power consumption as compared to when power is supplied.

In the stationary phase energization control and the energization off control, the duty in the position feedback control is not employed. However, for convenience, the duty is described to be 0 in the drawing.

As shown by the motor angle θm and the output shaft angle θs in FIG. 7, the rotation state of the motor 10 is the idle running state from the time x1 to the time x2, and a term from the time x1 to the time x2 is set to an idle running term. In the idle running term, the motor angle θm and the output shaft angle θs are different. In the idle running term, the motor angle variation amount Δθm does not equal to 0 since the motor angle θm varies. The output shaft angle variation amount Δθs nearly equal to 0 since the output shaft angle θs is constant. That is, in the idle running term, the motor angle variation amount Δθm and the output shaft angle variation amount Δθs are different.

The idle running term ends, the motor angle θm and the output shaft angle θs match, and the output shaft angle θs similarly varies corresponding to the variation of the motor angle θm. Hence, the motor angle variation amount Δθm and the output shaft angle variation amount Δθs match when the idle running state ends. According the embodiment, the rotation state of the motor 10 is determined as the idle running state when the motor angle variation amount Δθm and the output shaft angle variation amount Δθs are different. Thereby, it may be possible to appropriately determine whether the rotation state of the motor 10 is in the idle running state based on the motor angle θm and the output shaft angle θs.

As explained above, the shift range control apparatus 40 switches the shift range by controlling the drive of the motor 10, and includes the idle running determiner 57 and the duty limiter 58.

The idle running determiner 57 determines whether the rotation state is the idle running state that the motor 10 rotates within the range of the play existing between a motor shaft that is the rotation shaft of the motor 10 and the output shaft 15 to which the rotation of the motor 10 is transmitted.

The duty limiter 58 limits the current of the motor 10 in a case of determining as the idle running state.

Thereby, it may be possible to reduce the collision sound at the time of shift range switching.

The idle running determiner 57 determines whether the rotation state is the idle running state, based on the motor angle θm corresponding to the rotation of the motor 10 and the output shaft angle θs corresponding to the rotation of the output shaft 15.

Specifically, the idle running determiner 57 determines the rotation state as the idle running state when the output shaft angle variation amount Δθs and the motor angle variation amount Δθm are different. Thereby, it may be possible to appropriately determine the idle running state, based on the motor angle θm and the output shaft angle θs.

Second Embodiment

Figure 8:
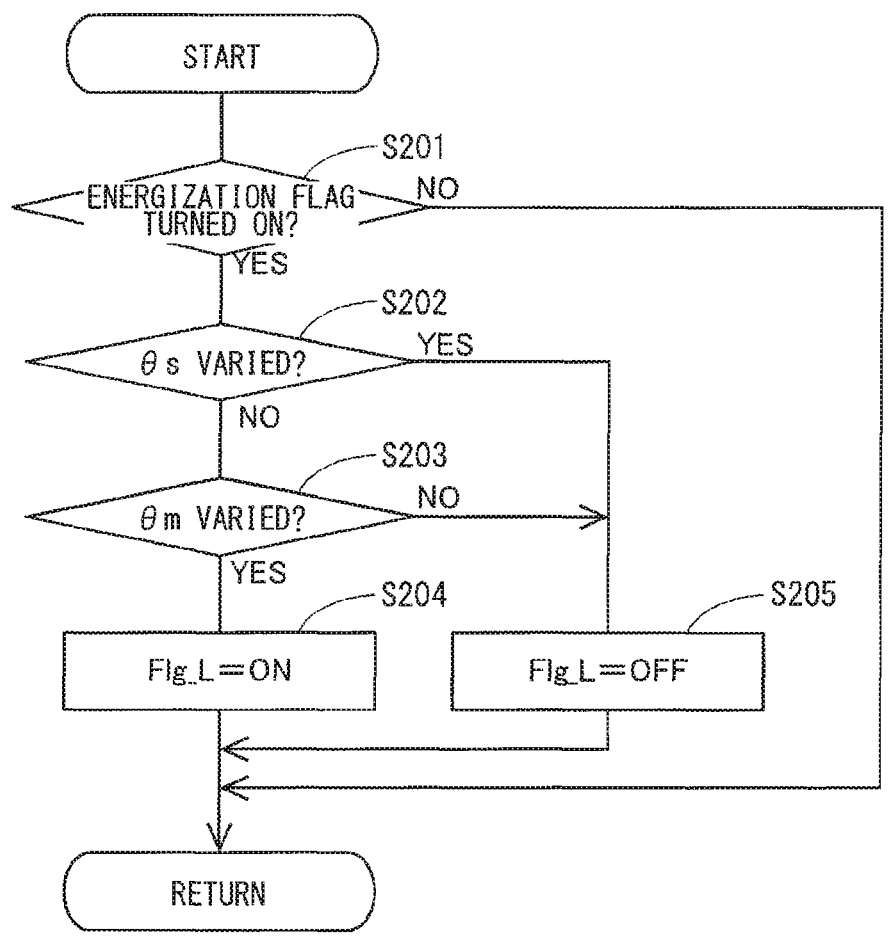
FIG. 8 is a flowchart explaining the idle running determination process according to a second embodiment of the present disclosure.

FIG. 8 shows a second embodiment of the present disclosure.

According the embodiment, the idle running determiner 57 determines the rotation state as the idle running state when the motor angle variation amount Δθm and the output shaft angle variation amount Δθs do not match.

In a case where the rotation state of the motor 10 is the idle running state, the rotation of the motor 10 is not transmitted to the output shaft 15. Therefore, the output shaft 15 does not rotate, and the output shaft angle θs does not vary. According to the embodiment, the idle running determiner 57 determines that the rotation of them motor 10 is the idle running state when the output shaft 15 does not rotate and also the motor 10 rotates.

It may be possible to determine whether the output shaft 15 rotates, based on whether the output shaft angle θs varies. It may be possible to determine whether the motor 10 rotates, based on whether the motor angle θm varies. It may be possible to determine whether the output shaft angle θs and the variation of the motor angle θm vary, based on the output shaft angle variation amount Δθs and the motor angle variation amount Δθm, which being the difference value between the previous value and the present value. It may be possible to determine that the output shaft angle θs does not vary when the output shaft angle variation amount Δθs is equal to or less than a determination threshold value set to a value being close to 0. It may be possible to determine that the output shaft angle θs vary when the output shaft angle variation amount Δθs exceeds the determination threshold value set to a value being close to 0. It may be possible to determine whether to vary by employing the derivation of the output shaft angle θs or the like, instead of the output shaft angle variation amount Δθs. The motor angle θm may be treated similarly.

It may be determined whether the motor 10 rotates, based on the actual count value Cen before the conversion of the gear ratio with omitting the conversion at the gear ratio, instead of the motor angle θm being the value converted at the gear ratio.

The idle running determination process according to the embodiment will be explained with reference to a flowchart shown in FIG. 8. This process is executed in the ECU 50 in a predetermined period, similarly to the process of FIG. 6.

Figure 6:
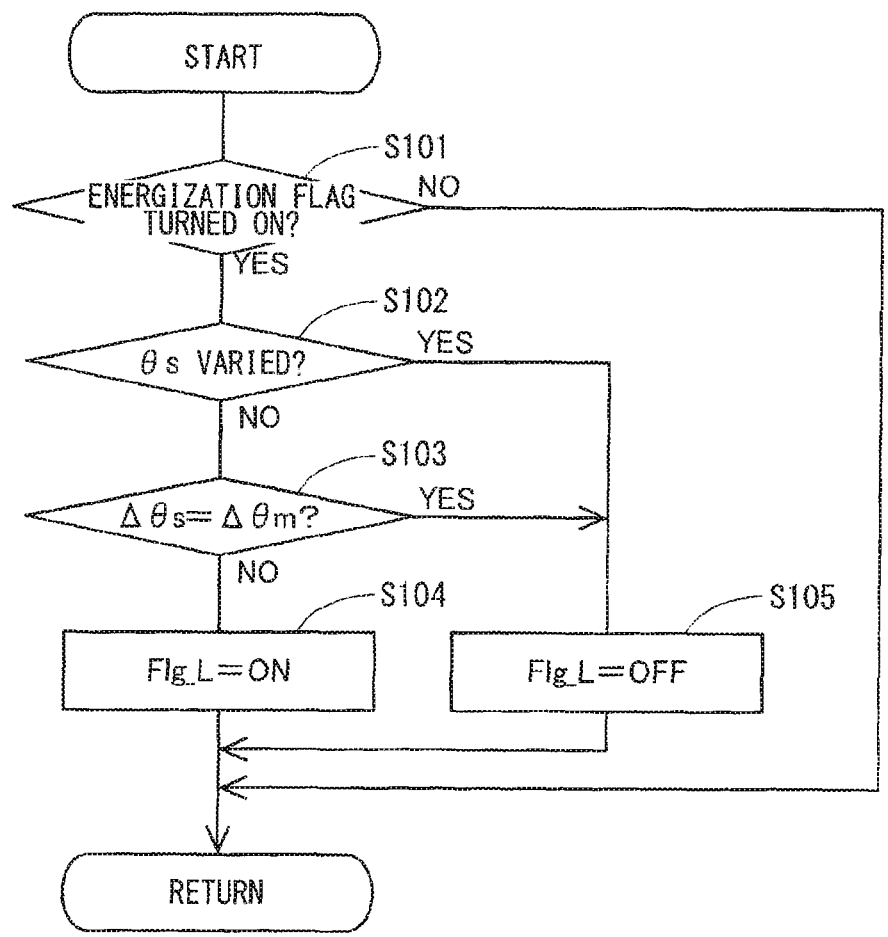
FIG. 6 is a flowchart explaining an idle running determination process according to the first embodiment.

The processes S201, S202, S204, and S205 are similar to the processes S101, S102, S104, and S105 in FIG. 6. Therefore, the detailed explanation will be omitted.

When it is determined that the output shaft angle θs does not vary (S202: NO), the process shifts to S203. In S203, it is determined whether the motor angle θm varies. When it is determined that the motor angle θm does not vary (S203: NO), the process shifts to S205. When it is determined that the motor angle θm varies (S203: YES), the process shifts to S204.

That is, according to the embodiment, when the output shaft angle θs does not vary (S202: NO) and also the motor angle θm varies (S203: YES), the rotation state of the motor 10 is regarded as the idle running state, the current limitation flag Flg_L turns on, and the duty is limited (S204).

As shown by the motor angle θm and the output shaft angle θs in FIG. 7, the motor 10 rotates and the motor angle θm varies in a term of the idle running. By contrast, the output shaft 15 does not rotate and the output shaft angle θs is constant in the term of the idle running. The idle running term ends, and the output shaft 15 and the motor shaft integrally rotate. Therefore, the output shaft angle θs and the motor angle θm similarly vary. Accordingly, it may be possible to appropriately determine whether the rotation state of the motor 10 is the idle running state, based on the motor angle θm and the output shaft angle θs, even when determining as the embodiment.

According to the embodiment, the idle running determiner 57 determines the rotation state as the idle running state when the output shaft angle θs does not vary and also the motor angle θm varies. Thereby, it may be possible to appropriately determine the idle running state, based on the output shaft angle θs and the motor angle θm.

The effect similarly to the embodiment described above will be provided.

Other Embodiments

According to the embodiment described above, the motor is a permanent magnet three-phase brushless motor. According to the other embodiments, the motor may be employed as not only the permanent magnet three-phase brushless motor but also any motor capable of providing the current limitation or the like. According to the embodiment described above, two winding groups are placed in the motor. According to the other embodiments, the number of sets of windings in the motor may be one, or three or more.

According to the embodiment described above, the position feedback control performs a 120° energization square-wave control scheme. According to the other embodiments, the position feedback control may perform a 180° energization square-wave control scheme. The control scheme is not limited to square-wave control. PWM control with triangle wave comparison or instantaneous vector selection is also possible.

According to the embodiment described above, the motor control state is switched between the position feedback control and the stationary phase energization control. According to the other embodiments, the motor drive controller may set at least one of the position feedback control or the stationary phase energization control to a different control state. According to the embodiment described above, the position feedback control and the stationary phase energization control are switched. According to the embodiment, it may control the drive of the motor in one control state such as the position feedback control, for example, without switching the control state of the motor.

According to the embodiment described above, the motor current is limited by limiting the duty. According to the other embodiments, the motor may be limited by limiting a parameter except for the duty, for example, a current command value, a voltage command value, or a torque command value, or the like.

According to the embodiment described above, the encoder is employed as rotation angle sensor detecting the motor angle of the motor. According to the other embodiments, the rotation angle sensor may be employed as not only the encoder but also any other devices such as a resolver or the like. According to the embodiment described above, phase advance filter process is performed to the count value of the encoder, the count value of the encoder is used for the position feedback control. According to the other embodiments, the position feedback control may be performed by using the rotation angle itself of the motor, or other values convertible to the motor rotation angle, other than the encoder count. Selection of a stationary phase in the stationary phase energization control may be treated similarly. According to the other embodiments, the phase advance filter process may be omitted.

According to the embodiment described above, four recesses are placed in the detent plate. According to the other embodiments, the number of the recess is not limited to four, and may be any number. For example, the number of the recess of the detent plate may be two, and P range and not P range may be switched. The shift range switching mechanism and the parking lock mechanism or the like may be different from the embodiment described above.

As described above, the reducer is placed between the motor shaft of the motor and the output shaft. According to the other embodiment, the reducer between the motor shaft of the motor and the output shaft may be omitted, and a machine except for the reducer may be placed. That is, according to the embodiment, it is mainly explained that "the play" between the motor shaft and the output shaft exists between the output shaft and the gear of the reducer. However, "the play" can be regarded as a total of the play, clank, or the like, existing between the motor shaft and the output shaft.

According to the other embodiments, it may determine the idle running determination, by not only the determination method according to the embodiment described above but also any method, based on the output shaft angle and the motor angle. In the idle running determination process according to the first embodiment, the process of S102 may be omitted.

According to the embodiment described above, it is set to match the motor shaft angle converted at the gear ratio to the output shaft angle. According to the other embodiments described above, it may match the output shaft angle converted at the gear ratio to the motor shaft angle. Conveniently, the conversion at the gear ratio may be omitted when the reducer is not placed in the motor shaft and the output shaft, or the like.

It is noted that a flowchart or the processing of the flowchart in the present application includes multiple steps (also referred to as sections), each of which is represented, for instance, as S101. Further, each step can be divided into several sub-steps while several steps can be combined into a single step.

In the above, the embodiment, the configuration, an aspect of the shift range apparatus according to the present disclosure are exemplified. However, the present disclosure is not limited to every embodiment, every configuration and every aspect related to the present disclosure are exemplified. For example, the field of the embodiment, the configuration, the aspect relate to the present disclosure includes the embodiment, the configuration, the aspect obtained by accordingly combining each technical part disclosed in different embodiment, configuration and aspect.

What is claimed is:

1. A shift range control apparatus switching a shift range by controlling a drive of a motor, the shift range control apparatus comprising:
    an idle running determiner that is configured to determine whether a rotation state of the motor is an idle running state in which the motor rotates within a range of play existing between a motor shaft being a rotation shaft of the motor and an output shaft to which a rotation of the motor is transmitted;
    a current limiter that is configured to limit a current of the motor when it is determined that the rotation state of the motor is the idle running state; and
    a reducer placed between the motor shaft and the output shaft,
    wherein:
    in the idle running state, the motor rotates in a state that a gear of the reducer and the output shaft are separated from each other in a side of a rotation direction.

2. The shift range control apparatus according to claim 1, wherein:
    the idle running determiner determines whether the rotation state of the motor is the idle running state based on a motor angle being an angle corresponding to the rotation of the motor and on an output shaft angle being an angle corresponding to the rotation of the output shaft.

3. The shift range control apparatus according to claim 2, wherein:
    the idle running determiner determines that the rotation state of the motor is the idle running state when an output shaft angle variation amount being a variation amount of the output shaft angle is different from a motor angle variation amount being a variation amount of the motor angle.

4. The shift range control apparatus according to claim 2, wherein:
    the idle running determiner determines that the rotation state is the idle running state when the output shaft angle does not change and also when the motor angle changes.

5. The shift range control apparatus according to claim 1, wherein
    the current limiter is configured to limit a maximum value of the current of the motor when it is determined that the rotation state of the motor is in the idle running state so as to limit a rotation speed of the motor and thereby suppress a collision sound between the reducer and the output shaft.

* * * * *